(12) United States Patent
Jang et al.

(10) Patent No.: US 10,243,212 B2
(45) Date of Patent: Mar. 26, 2019

(54) ELECTRODE ASSEMBLY FOR SULFUR-LITHIUM ION BATTERY AND SULFUR-LITHIUM ION BATTERY INCLUDING THE SAME

(71) Applicant: LG CHEM, LTD., Seoul (KR)

(72) Inventors: Min Chul Jang, Daejeon (KR); Hong Kyu Park, Daejeon (KR); Yu Mi Kim, Daejeon (KR); Byoung Kuk Son, Daejeon (KR); Da Young Sung, Daejeon (KR); Seong Ho Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 74 days.

(21) Appl. No.: 14/409,861

(22) PCT Filed: Jun. 3, 2014

(86) PCT No.: PCT/KR2014/004905
§ 371 (c)(1),
(2) Date: Dec. 19, 2014

(87) PCT Pub. No.: WO2014/196777
PCT Pub. Date: Dec. 11, 2014

(65) Prior Publication Data
US 2016/0093887 A1  Mar. 31, 2016

(30) Foreign Application Priority Data
Jun. 3, 2013 (KR) ................. 10-2013-0063522

(51) Int. Cl.
| | |
|---|---|
| *H01M 4/58* | (2010.01) |
| *H01M 2/02* | (2006.01) |
| *H01M 4/38* | (2006.01) |
| *H01M 10/052* | (2010.01) |
| *H01M 10/0525* | (2010.01) |
| *H01M 10/058* | (2010.01) |
| *H01M 4/13* | (2010.01) |
| *H01M 4/62* | (2006.01) |

(52) U.S. Cl.
CPC ....... *H01M 4/5815* (2013.01); *H01M 2/0285* (2013.01); *H01M 4/13* (2013.01); *H01M 4/38* (2013.01); *H01M 10/052* (2013.01); *H01M 10/058* (2013.01); *H01M 10/0525* (2013.01); *H01M 4/625* (2013.01); *Y02T 10/7011* (2013.01)

(58) Field of Classification Search
CPC ...... H01M 4/136; H01M 4/38; H01M 4/5815; H01M 4/62; Y02E 60/122
See application file for complete search history.

(56) References Cited

U.S. PATENT DOCUMENTS

| | | | | |
|---|---|---|---|---|
| 4,794,056 A | * | 12/1988 | Pedicini | H01M 2/263 429/211 |
| H1721 H | * | 4/1998 | Wainwright | 429/49 |
| 9,112,212 B1 | * | 8/2015 | Fasching | H01M 4/134 |
| 2005/0053839 A1 | | 3/2005 | Ryu et al. | |
| 2007/0264571 A1 | * | 11/2007 | Ryu | H01M 4/62 429/218.1 |
| 2008/0145761 A1 | * | 6/2008 | Petrat | C23C 16/24 429/231.8 |
| 2008/0305395 A1 | * | 12/2008 | Hirose | H01M 4/045 429/218.1 |
| 2010/0216032 A1 | * | 8/2010 | Baba | H01M 4/366 429/322 |
| 2012/0021287 A1 | * | 1/2012 | Lee | H01M 4/364 429/220 |
| 2012/0121973 A1 | | 5/2012 | Seo et al. | |
| 2013/0065127 A1 | | 3/2013 | Nazar et al. | |
| 2013/0266877 A1 | * | 10/2013 | Ryhanen | H01M 4/131 429/405 |
| 2013/0302678 A1 | * | 11/2013 | He | H01M 10/0525 429/213 |
| 2013/0309571 A1 | * | 11/2013 | Yoon | H01M 4/583 429/213 |

FOREIGN PATENT DOCUMENTS

| | | |
|---|---|---|
| CN | 1285086 A | 2/2001 |
| CN | 1329373 A | 1/2002 |
| CN | 1336696 A | 2/2002 |
| CN | 102782915 A | 11/2012 |
| CN | 102790212 A | 11/2012 |
| EP | 2595221 A1 | 5/2013 |
| JP | 9-027317 A | 1/1997 |
| JP | 11195419 | 7/1999 |
| JP | 2003532976 A | 11/2003 |
| JP | 2012-142101 A | 7/2012 |
| JP | 2013-008691 A | 1/2013 |
| JP | 2013-225496 A | 10/2013 |
| KR | 1020050104625 A | 11/2005 |
| KR | 1020120051993 A | 5/2012 |
| KR | 1020130008883 A | 1/2013 |
| KR | 10-1256059 B1 | 4/2013 |
| RU | 2402842 C2 | 4/2009 |
| WO | 0135474 A1 | 5/2001 |
| WO | 2007/049872 A1 | 5/2007 |
| WO | 2007139333 A1 | 12/2007 |
| WO | 2009128605 A2 | 10/2009 |

* cited by examiner

*Primary Examiner* — Scott J. Chmielecki
(74) *Attorney, Agent, or Firm* — Dentons US LLP

(57) ABSTRACT

Disclosed are an electrode assembly for sulfur-lithium ion batteries that uses a lithium-containing compound as a cathode active material and a sulfur-containing compound as an anode active material and a sulfur-lithium ion battery including the same.

19 Claims, No Drawings

ELECTRODE ASSEMBLY FOR SULFUR-LITHIUM ION BATTERY AND SULFUR-LITHIUM ION BATTERY INCLUDING THE SAME

This application is a 35 USC § 371 National Stage entry of International Application No. PCT/KR2014/004905, filed on Jun. 3, 2014, which claims priority of Korean Application No. 10-2013-0063522, filed on Jun. 3, 2013, which is hereby incorporated by reference in its entirety.

TECHNICAL FIELD

The present invention relates to an electrode assembly for sulfur-lithium ion batteries that includes a lithium-containing compound as a cathode active material and a sulfur-containing compound as an anode active material and a sulfur-lithium ion battery including the same.

BACKGROUND ART

In line with miniaturization of portable electronic devices, high integration, and development of hybrid electric vehicles (HEVs) and electric vehicles (EVs), there is demand for secondary batteries having high energy density.

Lithium-sulfur batteries are battery systems using sulfur as a cathode active material and lithium metal as an anode active material. During discharging, sulfur at a cathode is reduced by receiving electrons and lithium at an anode is oxidized through ionization.

Sulfur reduction is a process whereby a sulfur-sulfur (S—S) bond is converted into a sulfur anion by receiving two electrons. Meanwhile, lithium oxidation is a process whereby lithium metal is converted into lithium ions by releasing electrons and the lithium ions are transferred to a cathode through an electrolyte to form sulfur anions and a salt.

Sulfur prior to discharging has a cyclic $S_8$ structure and is converted into lithium polysulfide by reduction reaction. Lithium polysulfide is completely reduced to form lithium sulfide ($Li_2S$).

An electrolyte disposed between a cathode and an anode acts as a medium through which lithium ions move.

On the other hand, during charging, sulfur at a cathode is oxidized by releasing electrons and lithium ions at an anode are converted into lithium metal by reduction reaction by receiving the electrons.

During charging, reaction in which sulfur releases electrons to form an S—S bond occurs and reaction in which lithium ions are reduced into lithium metal by receiving electrons at a Li anode surface occurs.

When bonds in cyclic sulfur are broken by reduction reaction, a polysulfide ion of $S_n^{2-}$ where n is the length of sulfur chain is formed. In this regard, n may be 8 or more, and cyclic sulfur and the polysulfide ion may be converted into a polysulfide ion having a relatively long chain through the following reaction:

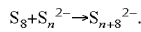

$$S_8 + S_n^{2-} \rightarrow S_{n+8}^{2-}.$$

The most notable characteristics of such lithium-sulfur battery systems are far higher theoretical energy density than that of other battery systems. High energy density is derived from high specific capacities of sulfur and lithium. However, to achieve high energy density, high utilization of sulfur and lithium needs to be secured.

In addition, lithium-sulfur batteries may be manufactured at reduced manufacturing cost.

In particular, sulfur, which is inexpensive and abundant, is used as a cathode active material and, accordingly, manufacturing costs of a lithium-sulfur battery may be reduced. In addition, while anode fabrication of a lithium ion battery includes preparation and coating of a slurry, drying, and pressing, a lithium-sulfur battery uses lithium metal as an anode without pre-treatment thereof and thus manufacturing processes may be simplified and, consequently, manufacturing costs may be reduced. In addition, while in lithium ion batteries gases generated when lithium is intercalated into a carbon material as an anode active material are removed through activation, in a lithium-sulfur battery, gases are not generated because lithium ions are deposited on a surface of lithium metal and thus an activation process is not needed. Due to omitting of such process, there are great effects in reducing manufacturing costs of batteries.

DISCLOSURE

Technical Problem

However, a lithium-sulfur battery still has safety problems for lithium metal in spite of the advantages described above and thus utilization of sulfur is low. In addition, lithium polysulfide generated at a cathode during discharging is reduced at a surface of lithium metal during charging to form an unstable film at the surface of lithium metal and thus the amount of active sulfur continuously decreases and, as a result, cycle characteristics are deteriorated.

The inventors of the present invention confirmed that a battery system using sulfur as an anode active material may address the problems describe above, thus completing the present invention.

Therefore, an object of the present invention is to provide a novel battery system having enhanced safety and cycle characteristics as compared to conventional lithium-sulfur batteries.

Technical Solution

In accordance with aspects of the present invention, provided are an electrode assembly including: a cathode including a lithium-containing compound as a cathode active material; an anode including a sulfur-containing compound as an anode active material; and a separator disposed between the cathode and the anode and a sulfur-lithium ion battery manufactured by accommodating the electrode assembly in a battery case, impregnating the electrode assembly with an electrolyte, and sealing the battery case.

In particular, the electrode assembly and the sulfur-lithium ion battery according to the present invention use a lithium-containing compound as a cathode active material and a sulfur-containing compound as an anode active material.

The lithium-containing compound as used herein may be understood as a compound capable of supplying lithium ions to the anode by oxidization during initial charge. In particular, the lithium-containing compound is a compound that enables intercalation and deintercalation of lithium ions during charge and discharge and may be at least one selected from the group consisting of lithium transition metal oxides and derivatives thereof, and lithium transition metal phosphates and derivatives thereof.

More particularly, examples of the lithium-containing compound include, but are not limited to, layered compounds such as lithium cobalt oxide ($LiCoO_2$) and lithium nickel oxide ($LiNiO_2$), or compounds substituted with one or more transition metals; lithium manganese oxides having the formula $Li_{1+y}Mn_{2-y}O_4$ where $0 \leq y \leq 0.33$, such as $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides of Formula $LiNi_{1-y}M_yO_2$ where M=Co, Mn, Al, Cu, Fe, Mg, B, or Ga, and $0.01 \leq y \leq 0.3$; lithium manganese composite oxides of Formula $LiMn_{2-y}M_yO_2$ where M=Co, Ni, Fe, Cr, Zn, or Ta, and $0.01 \leq y \leq 0.1$), or Formula $Li_2Mn_3MO_8$ where M=Fe, Co, Ni, Cu, or Zn; $LiMn_2O_4$ in which some of the Li atoms are substituted with alkaline earth metal ions; disulfide compounds; and $Fe_2(MoO_4)_3$.

The sulfur-containing compound as used herein may be understood as a compound that receives lithium ions through reduction during initial charge. In particular, the sulfur-containing compound may be a sulfur-based compound selected from the group consisting of inorganic sulfur or elemental sulfur ($S_8$), $Li_2S_n$ where $1 \leq n \leq 8$ an organic sulfur compound, and a carbon-sulfur complex ($C_{2x}S_y$ where $0 \leq x \leq 2$ and $1 \leq y \leq 40$) or a mixture of at least two thereof.

As the separator, an insulating thin film having high ion permeability and mechanical strength is used. The separator typically has a pore diameter of 0.01 to 10 μm and a thickness of 5 to 300 μm. As the separator, sheets or non-woven fabrics, made of an olefin-based polymer such as polypropylene; or glass fibers or polyethylene, which have chemical resistance and hydrophobicity, or Kraft paper is used. Examples of commercially available separators include Celgard series such as Celgard® 2400 and 2300 (available from Hoechest Celanese Corp.), polypropylene separators (available from Ube Industries Ltd., or Pall RAI Co.) and polyethylene series (available from Tonen or Entek).

In some cases, a gel polymer electrolyte may be coated on the separator to enhance battery stability. Examples of gel polymers include, but are not limited to, polyethylene oxide, polyvinylidene fluoride, and polyacrylonitrile.

When a solid electrolyte such as a polymer or the like is used as an electrolyte, the solid electrolyte may also act as a separator.

The cathode and the anode may further include at least one of a conductive material and a binder.

The conductive material is not particularly limited so long as it has high conductivity and a wide surface area. Examples of the conductive material include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

In a specific embodiment, the conductive material may have an average particle diameter of 1.0 μm or less and a specific surface area of 10 $m^2/g$ or more.

The binder may be all binders known in the art and, in particular, be one selected from the group consisting of fluorine resin-based binders such as polyvinylidene fluoride (PVdF) and polytetrafluoroethylene (PTFE), rubber-based binders such as styrene-butadiene rubber, acrylonitrile-butadiene rubber, and styrene-isoprene rubber, cellulose-based binders such as carboxymethyl cellulose (CMC), starch, hydroxypropylcellulose, and regenerated cellulose, polyalcohol-based binders, polyolefin-based binders such as polyethylene and polypropylene, polyimide-based binders, polyester-based binders, mussel adhesives, and silane-based binders or a mixture or copolymer of at least two thereof.

A solvent may be selectively used according to kind of a binder and, for example, be an organic solvent such as isopropyl alcohol, N-methylpyrrolidone (NMP), acetone, or the like, water, or the like.

In a specific embodiment, a binder solution may be prepared by dispersing or dissolving PVdF in NMP or by dispersing or dissolving styrene-butadiene rubber (SBR)/carboxymethyl cellulose (CMC) in water.

The anode may further include a lithium polysulfide-adsorbing material and, in particular, the lithium polysulfide-adsorbing material may be alumina ($Al_2O_3$), but embodiments of the present invention are not limited thereto.

The electrolyte may be a lithium salt-containing non-aqueous electrolyte, and as the non-aqueous electrolyte, a non-aqueous electrolytic solution, an organic solid electrolyte, or an inorganic solid electrolyte may be used.

The lithium salt is a material that is readily soluble in the non-aqueous electrolyte and examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, chloroborane lithium, lower aliphatic carboxylic acid lithium, lithium tetraphenyl borate, and imide.

For example, the non-aqueous electrolytic solution may be an aprotic organic solvent such as N-methyl-2-pyrrolidinone, propylene carbonate, ethylene carbonate, butylene carbonate, dimethyl carbonate, diethyl carbonate, ethyl methyl carbonate, gamma butyrolactone, 1,2-dimethoxy ethane, 1,2-diethoxy ethane, tetrahydrofuran, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, or ethyl propionate. In addition, the organic solvent may be a mixture of at least two of the above-listed organic solvents.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC), or the like.

The anode and the cathode may be manufactured using a manufacturing method including the following processes.

The manufacturing method includes preparing a binder solution by dispersing or dissolving a binder in a solvent; preparing an electrode slurry by mixing the binder solution, an electrode active material, and a conductive material; coating the electrode slurry on a current collector; drying the electrode; and pressing the electrode to a certain thickness.

In some cases, the manufacturing method may further include drying the pressed electrode.

The preparing of the binder solution is a process of preparing a binder solution by dispersing or dissolving a binder in a solvent.

The electrode slurry may be prepared by mixing/dispersing an electrode active material and a conductive material in the binder solution. The prepared electrode slurry may be transferred using a storage tank and stored prior to coating. The electrode slurry may be continuously stirred in the storage tank to prevent the electrode slurry from hardening.

The coating of the electrode slurry is a process of coating the electrode slurry onto a current collector in a predetermined pattern and to a certain thickness by passing through a coater head.

The coating of the electrode slurry may be performed by distributing the electrode slurry on a current collector and uniformly dispersing the electrode slurry thereon using a doctor blade or the like, or by die-casting, comma coating, screen-printing, or the like. In another embodiment, the electrode slurry may be molded on a separate substrate and then adhered to a current collector via pressing or lamination.

The current collector is not particularly limited so long as it does not cause chemical changes in the fabricated battery and has high conductivity. For example, the current collector may be made of copper, stainless steel, aluminum, nickel, titanium, sintered carbon, copper or stainless steel surface-treated with carbon, nickel, titanium, silver, or the like, an aluminum-cadmium alloy, or the like. A cathode current collector may have fine irregularities at a surface thereof to increase adhesion between the cathode active material and the cathode current collector and may be used in any of various forms including a film, a sheet, foil, a net, a porous structure, a foam, and a non-woven fabric. In particular, the cathode current collector may be a current collector containing a metal such as aluminum, and an anode current collector may be a current collector containing a metal such as copper.

The drying of the electrode is a process of removing a solvent and moisture in the slurry to dry the slurry coated on the current collector. In a specific embodiment, the drying is performed in a vacuum oven at 50 to 200° C. for a period of one day.

The manufacturing method may further include a cooling process after the drying, and the cooling process may be performed by slowly cooling to room temperature so that a recrystalline structure of the binder is satisfactorily formed.

To increase capacity density of the electrode on which the coating process has been completed and to enhance adhesion between the current collector and the electrode active material, the electrode may be pressed to a desired thickness by passing through two rolls heated to high temperature. This process is referred to as a rolling process.

Before passing through the two rolls, the electrode may be pre-heated. The pre-heating process is a process of pre-heating the electrode before introduction into the two rolls to enhance electrode pressing effects.

The rolled electrode may be subjected to deposition or coating known in the art to form an electrically conductive layer.

The electrode with the electrically conductive layer formed thereon may be dried in a vacuum oven at 50 to 200° C. for a period of one day. The rolled electrode may be cut to a certain size and then dried.

After the drying process, a cooling process may further be performed, and the cooling process may be performed by slowing cooling to room temperature so that a recrystalline structure of the binder is satisfactorily formed.

A jellyroll-type electrode assembly may be manufactured by positioning a separator sheet between cathode and anode sheets manufactured using the method described above and winding the resulting structure.

A stack-type electrode assembly may be manufactured by interposing, between cathode and anode plates obtained by cutting the cathode and anode manufactured using the method described above to a predetermined size, a separator cut to a predetermined size corresponding to the size of the cathode and anode plates and stacking the resulting structure.

A stack/folding type electrode assembly may be manufactured by arranging at least two cathode plates and at least two anode plates on a separator sheet or arranging at least two unit cells, each of which includes the at least two cathode plates and the at least two anode plates with a separator therebetween, on a separator sheet such that cathodes and anodes face each other with the separator sheet therebetween and by winding the separator sheet or folding the separator sheet to the size of the electrode plates or the unit cells.

A battery pack including the sulfur-lithium ion battery may be used as a power source for an electric vehicle (EV), a hybrid electric vehicle (HEV), a plug-in hybrid electric vehicle (PHEV), and a device for storing power.

BEST MODE

Now, the present invention will be described in more detail with reference to the following examples. These examples are provided only for illustration of the present invention and should not be construed as limiting the scope and spirit of the present invention.

Example 1

A solid including $LiCoO_2$, Super-P (available from Timcal), and PVdF (6020 available from Solef) in a mass ratio of 95:2.5:2.5 was mixed with N-methyl-2-pyrrolidone (NMP) as a solvent to prepare a cathode slurry. The cathode slurry was coated onto 20 µm Al foil to manufacture a cathode having a loading amount of 3 $mAh/cm^2$.

A mixture of carbon powder and sulfur in a weight ratio of 20:80 was subjected to wet ball milling to obtain a carbon-sulfur complex. An anode mixture including 80.0 wt % of the carbon-sulfur complex, 10.0 wt % of Super-P as a conductive material, and 10.0 wt % of PVdF as a binder was added to NMP as a solvent to prepare an anode slurry and then the anode slurry was coated onto a 20 µm Al current collector to manufacture an anode having a loading amount of 3.3 $mAh/cm^2$.

The cathode, the anode, tetraethylene glycol dimethyl ether (TEGDME) with 1M $LiN(CF_3SO_2)_2$ dissolved therein as an electrolyte, and a polyolefin membrane (Celgard® 2400) as a separator were assembled to manufacture a battery cell.

Comparative Example 1

A mixture of carbon powder and sulfur in a weight ratio of 20:80 was subjected to wet ball milling to obtain a carbon-sulfur complex. A cathode mixture including 80.0 wt % of the carbon-sulfur complex, 10.0 wt % of Super-P as a conductive material, and 10.0 wt % of PVdF as a binder was added to NMP as a solvent to prepare a cathode slurry and then the cathode slurry was coated onto a 20 μm Al current collector to manufacture a cathode having a loading amount of 3.3 mAh/cm$^2$.

A battery cell was manufactured in the same manner as in Example 1, except that lithium foil having a thickness of about 150 μm was used as an anode.

Experimental Example 1

Cycle characteristics according to temperature of the battery cells manufactured according to Example 1 and Comparative Example 1 were compared. 100 charging and discharging cycles of the battery cells were repeated under the following conditions: charging at 0.1 C and discharging at 0.1 C. Capacity retention rate (%) at 100 cycles with respect to initial capacity of each battery cell was measured. Results are shown in Table 1 below.

TABLE 1

|  | 20° C. | 35° C. | 60° C. |
|---|---|---|---|
|  | Remaining capacity (%) | | |
| Example 1 | 92 | 95 | 88 |
| Comparative Example 1 | 75 | 50 | 20 |

As seen from the results shown in Table 1, the battery cell according to the present invention exhibits excellent effects on addressing cycle characteristic problems of existing lithium-sulfur batteries.

INDUSTRIAL APPLICABILITY

A sulfur-lithium ion battery according to the present invention includes a sulfur-containing compound as an anode active material and thus, unlike conventional lithium-sulfur batteries, deposition of lithium during charging does not occur and, as a result, the sulfur-lithium ion battery exhibits enhanced safety.

In addition, unlike conventional lithium-sulfur batteries, reduction in active sulfur according to reduction of lithium polysulfide during charging does not occur and thus the sulfur-lithium ion battery exhibits enhanced cycle characteristics.

The invention claimed is:
1. An electrode assembly comprising:
    a cathode comprising a lithium-containing compound as a cathode active material;
    an anode comprising a sulfur-containing compound as an anode active material,
    wherein the sulfur-containing compound is a carbon-sulfur complex ($C_{2x}S_y$ where $0<x\leq0.85$ and $1\leq y\leq40$); and
    a separator disposed between the cathode and the anode.
2. The electrode assembly according to claim 1, wherein the lithium-containing compound is at least one selected from the group consisting of lithium transition metal oxides, derivatives of the lithium transition metal oxides, lithium transition metal phosphates, and derivatives of the lithium transition metal phosphates.
3. The electrode assembly according to claim 1, wherein the cathode and the anode further comprise at least one of a conductive material and a binder.
4. The electrode assembly according to claim 3, wherein the conductive material has an average particle diameter of 1.0 μm or less and a specific surface area of 10 m$^2$/g or more.
5. The electrode assembly according to claim 1, wherein the anode further comprises a lithium polysulfide-adsorbing material.
6. The electrode assembly according to claim 5, wherein the lithium polysulfide-adsorbing material is alumina ($Al_2O_3$).
7. A sulfur-lithium ion battery comprising: the electrode assembly according to claim 1; an electrolyte; and a battery case.
8. The sulfur-lithium ion battery according to claim 7, wherein the electrolyte is a non-aqueous electrolyte comprising a lithium salt and an organic solvent, an organic solid electrolyte, or an inorganic solid electrolyte.
9. The sulfur-lithium ion battery according to claim 8, wherein the lithium salt is at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, LiSCN, LiC(CF$_3$SO$_2$)$_3$, (CF$_3$SO$_2$)$_2$NLi, chloroborane lithium, lower aliphatic carboxylic acid lithium, lithium tetraphenyl borate, and imide.
10. The sulfur-lithium ion battery according to claim 8, wherein the organic solvent is an aprotic organic solvent.
11. The sulfur-lithium ion battery according to claim 10, wherein the aprotic organic solvent is at least one selected from the group consisting of N-methyl-2-pyrrolidinone, propylene carbonate, ethylene carbonate, butylene carbonate, dimethyl carbonate, diethyl carbonate, ethyl methyl carbonate, gamma butyrolactone, 1,2-dimethoxy ethane, 1,2-diethoxy ethane, tetrahydrofuran, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.
12. The sulfur-lithium ion battery according to claim 8, wherein the organic solid electrolyte is at least one selected from the group consisting of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.
13. The sulfur-lithium ion battery according to claim 8, wherein the inorganic solid electrolyte is at least one selected from the group consisting of nitrides, halides and sulfates of lithium (Li) such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, and Li$_3$PO$_4$—Li$_2$S—SiS$_2$.
14. A method of manufacturing the electrode assembly according to claim 1, the method comprising manufacturing a jellyroll-type electrode assembly by positioning a separator sheet between a cathode sheet and an anode sheet and winding the cathode sheet, the anode sheet, and the separator sheet.
15. A method of manufacturing the electrode assembly according to claim 1, the method comprising manufacturing a stack-type electrode assembly by sequentially stacking a cathode plate, a separator, and an anode plate such that the separator is disposed between the cathode plate and the anode plate.

16. A method of manufacturing the electrode assembly according to claim 1, the method comprising manufacturing a stack/folding type electrode assembly by arranging at least two cathode plates and at least two anode plates on a separator sheet or arranging at least two unit cells, each comprising the at least two cathode plates and the at least two anode plates with a separator therebetween, on a separator sheet such that cathodes and anodes face each other with the separator sheet therebetween and by winding the separator sheet or folding the separator sheet to a size of the cathode and anode plates or the unit cells.

17. The sulfur-lithium ion battery according to claim 7, wherein a capacity retention rate (%) at 100 cycles with respect to initial capacity is 80% or more when 100 charging and discharging cycles are repeated at a current of 0.1 C and 20° C.

18. The sulfur-lithium ion battery according to claim 7, wherein a capacity retention rate (%) at 100 cycles with respect to initial capacity is 80% or more when 100 charging and discharging cycles are repeated at a current of 0.1 C and 35° C.

19. The sulfur-lithium ion battery according to claim 7, wherein a capacity retention rate (%) at 100 cycles with respect to initial capacity is 80% or more when 100 charging and discharging cycles are repeated at a current of 0.1 C and 60° C.

* * * * *